United States Patent
Berthelot

(10) Patent No.: US 11,734,415 B2
(45) Date of Patent: Aug. 22, 2023

(54) DEVICE AND METHOD FOR MANAGING AN ENCRYPTED SOFTWARE APPLICATION

(71) Applicant: STMicroelectronics (Grand Ouest) SAS, Le Mans (FR)

(72) Inventor: Vincent Berthelot, Le Mans (FR)

(73) Assignee: STMICROELECTRONICS (GRAND QUEST) SAS, Le Mans (FR)

( * ) Notice: Subject to any disclaimer, the term of this patent is extended or adjusted under 35 U.S.C. 154(b) by 560 days.

(21) Appl. No.: 16/922,120

(22) Filed: Jul. 7, 2020

(65) Prior Publication Data
US 2021/0011994 A1    Jan. 14, 2021

(30) Foreign Application Priority Data
Jul. 9, 2019    (FR) .................................. 1907655

(51) Int. Cl.
| | |
|---|---|
| G06F 21/53 | (2013.01) |
| G06F 12/14 | (2006.01) |
| G06F 21/60 | (2013.01) |
| G06F 21/72 | (2013.01) |

(52) U.S. Cl.
CPC .......... *G06F 21/53* (2013.01); *G06F 12/1408* (2013.01); *G06F 12/1466* (2013.01); *G06F 21/602* (2013.01); *G06F 21/606* (2013.01); *G06F 21/72* (2013.01)

(58) Field of Classification Search
CPC ............ G06F 12/1408; G06F 12/1466; G06F 15/7807; G06F 21/12; G06F 21/51; G06F 21/52; G06F 21/53; G06F 21/602; G06F 21/606; G06F 21/64; G06F 21/72; G06F 2221/2141
See application file for complete search history.

(56) References Cited

U.S. PATENT DOCUMENTS

| | | |
|---|---|---|
| 2006/0015749 A1 | 1/2006 | Mittal |
| 2009/0290712 A1 | 11/2009 | Henry et al. |
| 2012/0331308 A1* | 12/2012 | Fernandez Gutierrez .................. G06F 21/71 713/190 |
| 2014/0006797 A1 | 1/2014 | Cordella et al. |
| 2018/0101488 A1 | 4/2018 | Mangalampalli et al. |
| 2018/0211049 A1 | 7/2018 | Kelso et al. |

* cited by examiner

*Primary Examiner* — Theodore C Parsons
(74) *Attorney, Agent, or Firm* — Slater Matsil, LLP

(57) ABSTRACT

An embodiment integrated circuit comprises a first memory zone having a first level of access rights that is configured to store at least one first software application containing encrypted instructions, means for verifying the integrity of the first software application, an encryption/decryption means, for example a first logic circuit, that is configured to decrypt the encrypted instructions which are considered to exhibit integrity, a processing unit that is configured to execute the decrypted instructions, the first logic circuit being further configured to encrypt the data generated by the execution operation and a second means, for example a second logic circuit, that is configured to store the encrypted data in a second memory zone having a second level of access rights that is identical to the first level of access rights.

21 Claims, 3 Drawing Sheets

[Fig 1]
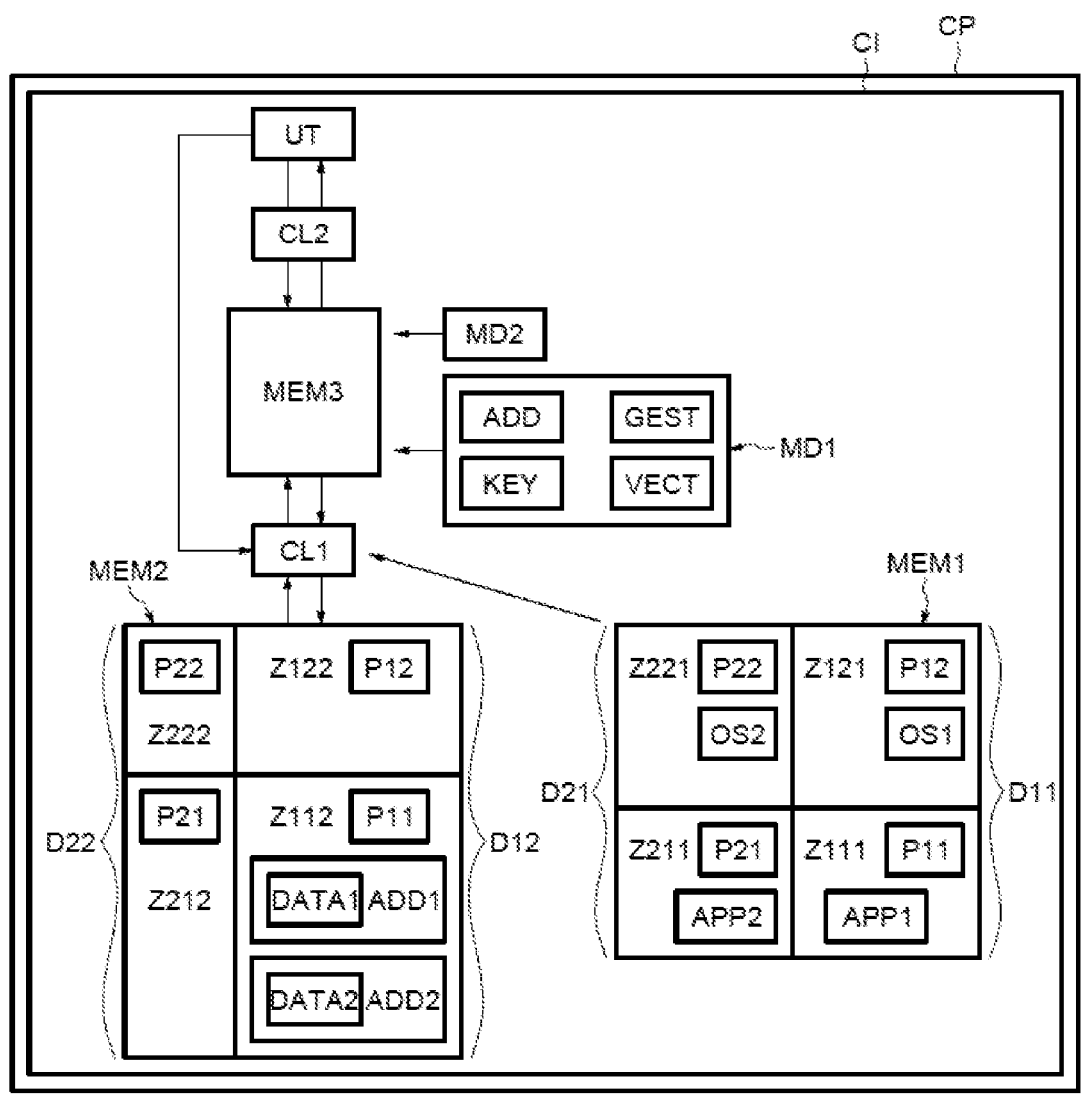

[Fig 2]
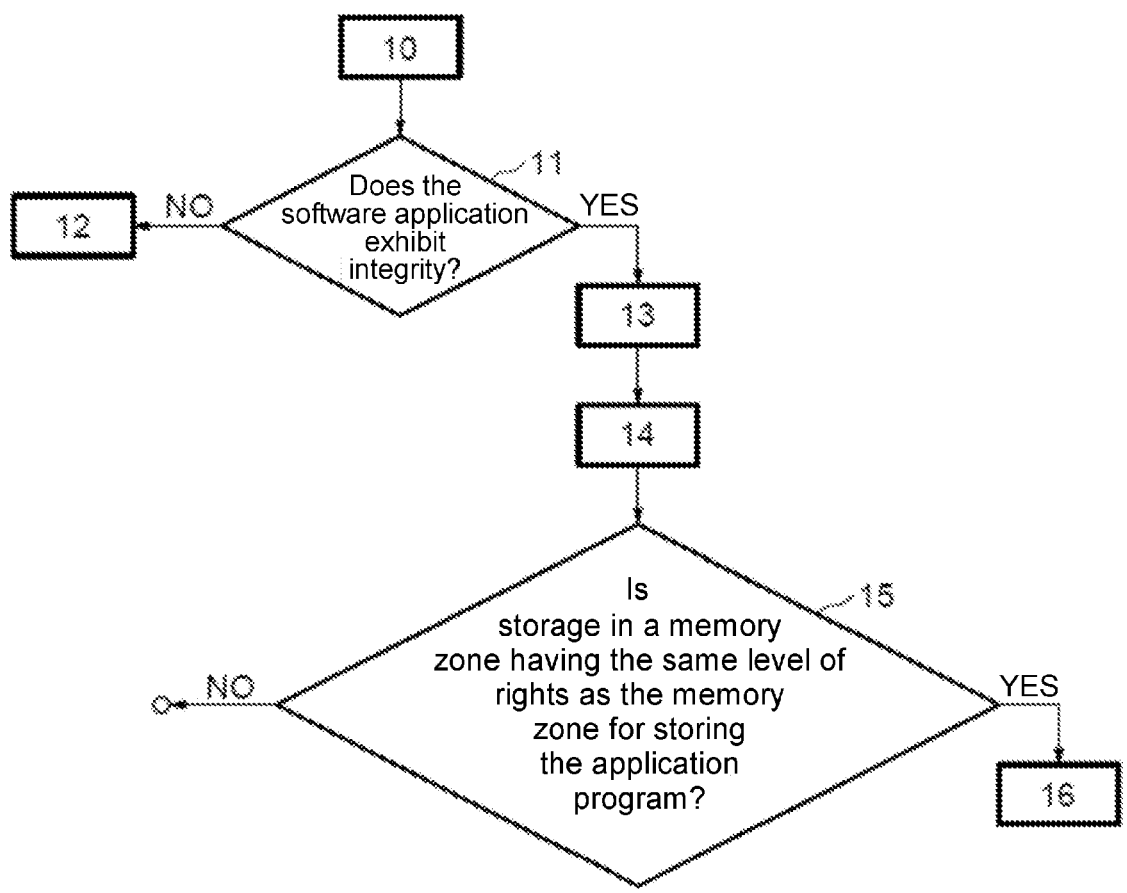

[Fig 3]
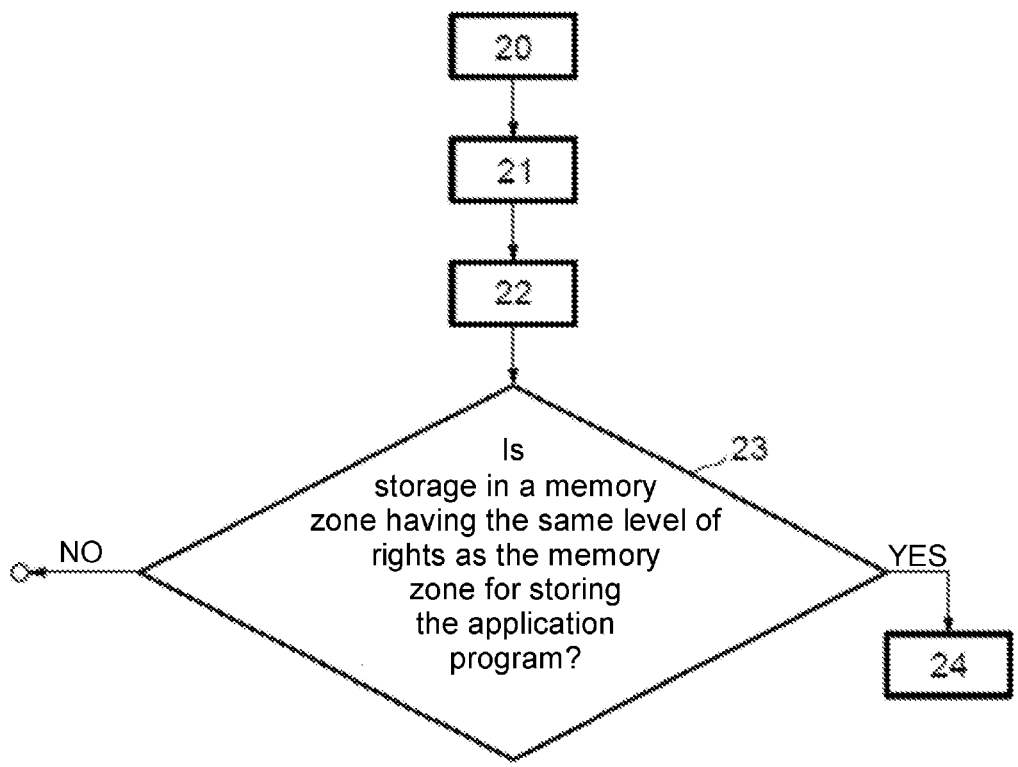
[Fig 4]
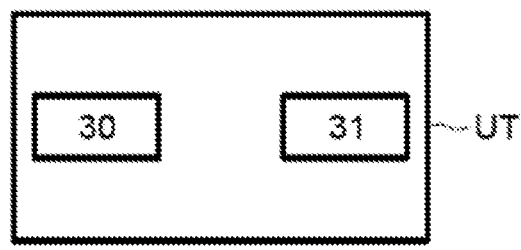

DEVICE AND METHOD FOR MANAGING AN ENCRYPTED SOFTWARE APPLICATION

CROSS-REFERENCE TO RELATED APPLICATIONS

This application claims the benefit of French Application No. 1907655, filed on Jul. 9, 2019, which application is hereby incorporated herein by reference.

TECHNICAL FIELD

Implementations and embodiments of the invention relate to integrated circuits and more particularly to integrated circuits forming systems on a chip (SoCs).

BACKGROUND

A system on a chip may comprise a memory containing an operating system for the system and software applications.

To prevent a malicious software application from reading the instructions of another software application and the data generated by the execution of instructions by a processing unit of the system on a chip, barriers, known to those skilled in the art as memory protection units, are put in place so that the software applications are isolated from one another.

However, the operating system may read the instructions of the software applications.

Moreover, if the operating system is corrupted, the isolating barriers disappear and the confidentiality of the instructions of the software applications and of the data associated with the software applications is no longer guaranteed.

Thus, there is a need to guarantee the confidentiality of the instructions of software applications and of data associated with the software applications, both between software applications and with respect to the operating system.

SUMMARY

According to implementations and embodiments, what is advantageously proposed is to encrypt the instructions of the software applications and data associated with the software applications and to store the encrypted data associated with a software application in a memory zone having the same rights as the memory zone in which the software application is stored.

According to one aspect, what is proposed is a method comprising:
  an operation of storing at least one first software application containing encrypted instructions in a first memory zone having a first level of access rights,
  an operation of verifying the integrity of the first software application,
  an operation of decrypting, using an encryption/decryption means, for example a logic circuit, the encrypted instructions which are considered to exhibit integrity,
  an operation of executing, using a processing unit, the decrypted instructions, the execution operation generating data,
  an operation of encrypting the generated data using the encryption/decryption means, and
  an operation of storing the encrypted data in a second memory zone having a second level of access rights that is identical to the first level of access rights.

The instructions and the data of the application programs are encrypted and safeguarded in two memory zones with the same level of access rights such that an item of operating software is not able to interpret the stored instructions and data which are encrypted.

According to one implementation, the first memory zone forms part of a first memory having a first additional memory zone having a first additional level of access rights that is higher than the first level of access rights, the first additional memory zone containing a first item of operating software for the processing unit.

According to another implementation, the first memory zone and the first additional memory zone form part of a secured domain of the first memory.

According to another implementation, the first memory further comprises an unsecured domain including a first unsecured memory zone storing at least one second software application and a second unsecured memory zone storing a second item of operating software for the processing unit, the second unsecured memory zone having a level of access rights that is higher than the level of access rights of the first unsecured memory zone.

According to another implementation, the method further comprises an operation of verifying the integrity of the at least one second software application.

A corrupted application program is not executed by a processing unit so that it does not corrupt other application programs or an item of operating software.

According to another implementation, the method further comprises an operation of decrypting the stored encrypted data, an operation of processing, by means of the processing unit, the decrypted data, the processing operation generating new data, an operation of encrypting, using the encryption/decryption means, the new data and an operation of storing the encrypted new data in the second memory zone.

According to another implementation, the second memory zone forms part of a second memory exhibiting a partition of domains and of memory zones that is identical to that of the first memory with respective levels of access rights that are homologous to those of the first memory, and the data generated by executing an item of software stored in one of the memory zones of the first memory are stored in the homologous memory zone of the second memory.

According to another implementation, the method comprises, prior to the operation of verifying the integrity of each software application, an operation of storing a first footprint and the memory size of the software application, and the operation of verifying the integrity includes an operation of calculating a second footprint of the software application using the memory size and an operation of comparing the two footprints with one another, the software application being considered to exhibit integrity if the two footprints are the same.

According to another implementation, the operation of calculating the second footprint comprises an operation of implementing a hash function having, as input parameter, the instructions and the memory size of the software application and delivering, as output, the second footprint.

According to another implementation, the operations of encrypting and decrypting the data implement a symmetric-key block cipher algorithm that includes no chaining between the blocks and uses a secret key.

The use of a block cipher algorithm that includes no chaining between the blocks allows one instruction in a block of instructions to be decrypted independently of the other instructions in the block, thereby guaranteeing the confidentiality of the instructions that do not need to be decrypted.

The block cipher algorithm may for example use a counter.

According to another implementation, the method comprises operations of executing the at least one first software application and the at least one second software application in parallel.

According to another aspect, what is proposed is an integrated circuit comprising:

- a first memory zone having a first level of access rights that is configured to store at least one first software application containing encrypted instructions,
- means for verifying the integrity of the first software application,
- an encryption/decryption means, for example a first logic circuit, that is configured to decrypt the encrypted instructions which are considered to exhibit integrity,
- a processing unit that is configured to execute the decrypted instructions, the encryption/decryption means being further configured to encrypt the data generated by the execution operation, and
- a second means, for example a second logic circuit, that is configured to store the encrypted data in a second memory zone having a second level of access rights that is identical to the first level of access rights.

According to another embodiment, the first memory zone forms part of a first memory comprising a first additional memory zone having a first additional level of access rights that is higher than the first level of access rights, the first additional memory zone being configured to contain a first item of operating software for the processing unit.

According to another embodiment, the first memory zone and the first additional memory zone form part of a secured domain of the first memory.

According to another embodiment, the first memory further comprises an unsecured domain including a first unsecured memory zone that is configured to store at least one second software application and a second unsecured memory zone that is configured to store a second item of operating software for the processing unit, the second unsecured memory zone having a level of access rights that is higher than the level of access rights of the first unsecured memory zone.

According to another embodiment, the means for verifying the integrity are further configured to verify the integrity of the at least one second software application.

According to another embodiment, the encryption/decryption means is further configured to decrypt stored encrypted data, the processing unit being further configured to process decrypted data, the encryption/decryption means is further configured to encrypt new data generated by the processing operation, the second means being further configured to store encrypted new data in the second memory zone.

According to another embodiment, the second memory zone forms part of a second memory comprising a partition of domains and of memory zones that is identical to that of the first memory with respective levels of access rights that are homologous to those of the first memory, the second means being further configured such that the data generated by executing an item of software stored in one of the memory zones of the first memory are stored in the homologous memory zone of the second memory.

According to another embodiment, the means for verifying the integrity are configured to store a first footprint and the memory size of the software application, to calculate a second footprint of the software application by using the memory size and to compare the two footprints.

According to another embodiment, the means for verifying the integrity are configured to calculate the second footprint by implementing a hash function having, as input parameter, the instructions and the memory size of the software application and delivering, as output, the second footprint.

According to another embodiment, the encryption/decryption means is configured to implement a symmetric-key block cipher algorithm that includes no chaining between the blocks and uses a secret key for encrypting and decrypting data.

According to another embodiment, the processing unit comprises at least two processor cores, a first processor core being configured to execute the at least one first software application and the second processor core being configured to execute the at least one second software application in parallel.

According to another aspect, what is proposed is a device incorporating an integrated circuit such as defined above.

BRIEF DESCRIPTION OF THE DRAWINGS

Other advantages and features of the invention will become apparent upon examining the detailed description of completely nonlimiting embodiments and the appended drawings, in which:

FIGS. 1-4 illustrate various embodiments and implementations of the invention.

DETAILED DESCRIPTION OF ILLUSTRATIVE EMBODIMENTS

Reference is made to FIG. 1, which shows one exemplary embodiment of an integrated circuit CI, incorporated within an electronic device CP, for example a tablet.

The integrated circuit CI forms here a system on a chip (SoC).

The integrated circuit CI comprises a first memory MEM1, a second memory MEM2, a processing unit UT, a memory management module MD1, a hashing module MD2 and a first logic circuit CL1, forming an encryption/decryption means, and a second logic circuit CL2.

The first memory MEM1 comprises a secured domain D11 comprising a first memory zone Z111 having a first level of access rights P11 and a first additional memory zone Z12 having a first additional level of access rights P12 that is higher than the first level of access rights P11.

The first memory zone Z111 is configured to store a first software application APP1 and the first additional memory zone Z12 is configured to store a first item of operating software OS1 for the processing unit UT.

The first memory MEM1 further comprises an unsecured domain D21 comprising a first unsecured memory zone Z211 having a second level of access rights P21 and a second unsecured memory zone Z221 having a second additional level of access rights P22 that is higher than the second level of access rights P21.

The first unsecured memory zone Z211 is configured to store a second software application APP2 and the second unsecured memory zone Z221 is configured to store a second item of operating software OS2 for the processing unit UT.

The instructions of the first and second software applications APP1 and APP2 are encrypted.

The first memory MEM1 is for example a non-volatile memory, such as a flash memory.

Of course, the first memory zone Z111 and the first unsecured memory zone Z211 may each comprise more than one software application.

The second memory MEM2 comprises a partition of domains and of memory zones that is identical to that of the first memory with respective levels of access rights that are homologous to those of the first memory.

The second memory MEM2 comprises partition into secured domains D12 and unsecured domains D22 and a memory zone Z112 having a level of access rights P11, a memory zone Z122 having a level of access rights P12, a memory zone Z212 having a level of access rights P21 and a memory zone Z222 having a level of access rights P22.

The second memory MEM2 is for example a non-volatile memory, such as a RAM or SRAM.

The memory management module MD1 contains:
 the addresses ADD of the domains and of the memory zones of the memories MEM1 and MEM2,
 a secret key KEY for encrypting and decrypting data and instructions, and an initialization, or initial, vector VECT, and
 a software application manager GEST comprising a first footprint and the size of each software application APP1, APP2, and an indication of the domain and of the memory zone for executing each application APP1, APP2.

It is assumed that the instructions of the application programs APP1 and APP2 are encrypted using the encryption key KEY and the initial vector VECT.

As a variant, the instructions of each application program may be encrypted using an initial vector and a different secret key.

The second logic circuit CL2 is configured such that the encrypted data generated by executing the software application APP1, APP2 that is stored in one of the memory zones of the first memory MEM1 are stored in the homologous memory zone of the second memory MEM2 that has an identical level of access rights on the basis of the addresses ADD and of the indication of the domain and of the memory zone for executing each application APP1, APP2 that are contained in the management module MD1.

The data ADD, KEY, VECT and GEST are loaded into the memory management module MD1 during the production of the integrated circuit CI, prior to the use of the integrated circuit CI.

The hashing module MD2 comprises a hash function having, as input parameter, the instructions and the memory size of a software application APP1, APP2, and delivering, as output, a second footprint of the software application.

Means for verifying the integrity are configured to store a first footprint and the memory size of each software application APP1, APP2, to calculate a second footprint of the software application by using the memory size and to compare the two footprints.

The verification means incorporate here the processing unit UT, the management module MD1 and the hashing module MD2.

If no instruction of the software application APP1, APP2 has been modified, the second footprint is identical to the first footprint, making it possible to confirm that the instructions have not been modified and thereby demonstrating the integrity of the software application.

The first logic circuit CL1 comprises here a symmetric-key block cipher algorithm in hardware.

The symmetric-key block cipher algorithm may for example use a counter CTR.

The symmetric-key block cipher algorithm is for example an AES or 3DES algorithm.

As a variant, the block cipher algorithm may be asymmetric.

The first CL1 and second CL2 logic circuits are formed for example from logic gates.

The use of a block cipher algorithm that includes no chaining between the blocks allows one instruction in a block of instructions to be decrypted independently of the other instructions in the block, thereby guaranteeing the confidentiality of the instructions that do not need to be decrypted.

The first logic circuit CL1 is configured to decrypt the encrypted instructions of the software applications APP1 and APP2 which are considered to exhibit integrity, the processing unit UT is configured to execute the decrypted instructions of the software applications APP1 and APP2 and the first logic circuit CL1 is configured to encrypt the data generated by executing the instructions. The processing unit UT is further connected to a volatile memory MEM3, for example a cache memory, via the second logic circuit CL2.

The instructions and the data that are sent to or come from the processing unit UT pass through the cache memory MEM3.

The processing unit UT is configured to deliver, as input to the first logic circuit CL1, the secret key KEY and the initialization vector VECT.

The processing unit UT is formed for example from a microprocessor, although it may be any device capable of configuring the first logic circuit CL1 and executing instructions of software applications.

Reference is made to FIG. 2, which illustrates a first exemplary implementation of the integrated circuit CI.

Hereinafter, it is assumed that only the software application APP1 is executed and generates data DATA1.

In a step 10, the processing unit UT executes the item of operating software OS1 so as to put barriers in place in order to create the memory zones Z111, Z121, Z112, Z122 and put barriers known to those skilled in the art as memory protection units in place such that the software applications are isolated from one another in one and the same memory zone. Next, the processing unit executes the item of operating software OS2 so as to create the memory zones Z211, Z221, Z212, Z222 and barriers for isolating the application programs present in one and the same memory zone from one another.

Next, in a step 11, the verification means verify the integrity of each software application APP1, APP2 by calculating and comparing a second footprint of each software application with the first footprint of the software application that is stored in the module MD1.

If the calculated second footprint is not identical to the stored first footprint, the software application is not activated and hence it is not executed by the processing unit UT (step 12).

If the calculated second footprint is identical to the stored first footprint, the software application is activated and the first logic circuit CL1 decrypts the instructions of the software application using the encryption key KEY and the initial vector VECT provided by the processing unit UT.

The decrypted instructions are stored in the memory MEM3.

It is assumed hereinafter that the software application APP1 exhibits integrity.

Next, in a step 13, the processing unit UT executes the instructions of the program APP1, thereby generating data DATA1.

In a step 14, the first logic circuit CL1 encrypts the data DATA1 using the initial vector VECT and the encryption key KEY.

Next, in a step 15, the logic circuit CL2 implementing the management module MD1 checks whether the address of the storage memory zone ADD1 for storing the encrypted data DATA1 listed in the data ADD has a level of access rights that is identical to the level of access rights of the domain for executing the application program APP1 listed in the data GEST.

If the levels of access rights are not identical, the encrypted data DATA1 are not stored in the storage memory zone bearing the address ADD1.

It is assumed that the address ADD1 corresponds to the first memory zone Z112 of the second memory MEM2.

Since the levels of access rights are identical, the encrypted data DATA1 are stored in the first memory zone Z112 of the second memory MEM2 (step 16).

Reference is made to FIG. 3, which illustrates a second exemplary implementation of the integrated circuit CI.

In this implementation, it is assumed that the encrypted data DATA1 resulting from the execution of the application program APP1 are stored in the first memory zone Z112 of the second memory MEM2 and that the memory MEM3 contains decrypted instructions of the application program APP1 requiring the data DATA1 in order to generate new data DATA2.

In a step 20, the first logic circuit CL1 decrypts the encrypted data DATA1 using the encryption key KEY and the initial vector VECT.

Next, in a step 21, the processing unit UT executes the instructions of the application program APP1 requiring the data DATA1 and generates the data DATA2.

In a step 22, the first logic circuit CL1 encrypts the new data DATA2 using the initial vector VECT and the encryption key KEY.

Next, in a step 23, the second logic circuit CL2 checks whether the address of the storage memory zone ADD2 for storing the encrypted data DATA2 listed in the data ADD has a level of access rights that is identical to the level of access rights of the domain for executing the application program APP1 listed in the data GEST.

If the levels of access rights are not identical, the encrypted data DATA2 are not stored in the storage memory zone bearing the address ADD2.

It is assumed that the address ADD2 corresponds to the first memory zone Z112 of the second memory MEM2.

Since the levels of access rights are identical, in a step 24, the encrypted data DATA2 are stored in the first memory zone Z112 of the second memory MEM2.

FIG. 4 illustrates a second embodiment of the processing unit UT.

The processing unit UT comprises two processor cores 30 and 31, a first processor core 30 being configured to execute the software application APP1 and the second processor core 31 being configured to execute the software application APP2 in parallel.

What is claimed is:

1. A method comprising:
    storing at least one first software application containing encrypted instructions in a first secured memory zone of a first memory, the first secured memory zone having a first level of access rights;
    storing a first item of operating software for a processor in a second secured memory zone of the first memory, the second secured memory zone having a second level of access rights that is higher than the first level of access rights;
    storing at least one second software application in a first unsecured memory zone of the first memory, the first unsecured memory zone having a third level of access rights;
    storing a second item of operating software for the processor in a second unsecured memory zone of the first memory, the second unsecured memory zone having a fourth level of access rights that is higher than the third level of access rights;
    verifying a first integrity of the at least one first software application;
    decrypting the encrypted instructions that are considered to exhibit integrity;
    executing, by the processor, the decrypted instructions to generate data;
    encrypting the generated data; and
    storing the encrypted data in a second memory zone having the first level of access rights, the second memory zone forming part of a second memory having a partition of domains and of memory zones that is identical to that of the first memory with respective levels of access rights that are homologous to those of the first memory, and the data generated by executing an item of software stored in one of the memory zones of the first memory being stored in a homologous memory zone of the second memory.

2. The method according to claim 1, further comprising verifying a second integrity of the at least one second software application.

3. The method according to claim 1, further comprising:
    decrypting the stored encrypted data;
    processing, by the processor, the decrypted data to generate new data;
    encrypting the new data; and
    storing the encrypted new data in the second memory zone.

4. The method according to claim 1, further comprising:
    prior to the verifying the first integrity of the at least one first software application, storing a first footprint and a memory size of the at least one first software application; and
    the verifying the first integrity comprising calculating a second footprint of the at least one first software application using the memory size, and comparing the first and second footprints with one another, the at least one first software application being considered to exhibit integrity in response to the first and second footprints being the same.

5. The method according to claim 4, wherein the calculating the second footprint comprises implementing a hash function having, as input parameter, the encrypted instructions and the memory size of the at least one first software application and delivering, as output, the second footprint.

6. The method according to claim 1, wherein the encrypting and decrypting the data implement a symmetric-key block cipher algorithm that includes no chaining between blocks and uses a secret key.

7. The method according to claim 1, further comprising executing the at least one first software application and the at least one second software application in parallel.

8. An integrated circuit comprising:
    a first memory comprising:

a first secured memory zone having a first level of access rights, and configured to store at least one first software application containing encrypted instructions; and a second secured memory zone having a second level of access rights that is higher than the first level of access rights, and configured to store a first item of operating software for a processor;

a first unsecured memory zone having a third level of access rights, and configured to store at least one second software application; and a second unsecured memory zone of having a fourth level of access rights that is higher than the third level of access rights, and configured to store a second item of operating software for the processor;

the processor, a memory management module and a hashing module, configured to verify a first integrity of the first software application;

a first logic circuit and the hashing module, configured to decrypt the encrypted instructions that are considered to exhibit integrity;

the processor further configured to execute the decrypted instructions to generate data;

the first logic circuit and the hashing module further configured to encrypt the generated data; and a second logic circuit configured to store the encrypted data in a second memory zone having the first level of access rights, wherein the second memory zone forms part of a second memory comprising a partition of domains and of memory zones that is identical to that of the first memory with respective levels of access rights that are homologous to those of the first memory, and wherein the second logic circuit is further configured such that the data generated by executing an item of software stored in one of the memory zones of the first memory are stored in a homologous memory zone of the second memory.

9. The integrated circuit according to claim 8, wherein the processor, the memory management module and the hashing module are further configured to verify a second integrity of the at least one second software application.

10. The integrated circuit according to claim 8, wherein the first logic circuit and the hashing module are further configured to decrypt the stored encrypted data, the processor is further configured to process decrypted data, the first logic circuit and the hashing module are further configured to encrypt new data generated by the processor, and the second logic circuit is further configured to store encrypted new data in the second memory zone.

11. The integrated circuit according to claim 8, wherein the processor, the memory management module and the hashing module are further configured to store a first footprint and a memory size of the at least one first software application, to calculate a second footprint of the at least one first software application by using the memory size and to compare the first and second footprints.

12. The integrated circuit according to claim 11, wherein the processor, the memory management module and the hashing module are further configured to calculate the second footprint by implementing a hash function having, as input parameter, the encrypted instructions and the memory size of the at least one first software application and delivering, as output, the second footprint.

13. The integrated circuit according to claim 8, wherein the first logic circuit is configured to implement a symmetric-key block cipher algorithm that includes no chaining between blocks and uses a secret key for encrypting and decrypting data.

14. The integrated circuit according to claim 8, wherein the processor comprises at least two processor cores, a first processor core configured to execute the at least one first software application, and a second processor core configured to execute the at least one second software application in parallel.

15. An integrated circuit comprising:
a first memory zone having a first level of access rights and configured to store at least one first software application containing encrypted instructions;
a processor, a memory management module and a hashing module, configured to verify an integrity of the first software application;
a first logic circuit and the hashing module, configured to decrypt the encrypted instructions that are considered to exhibit integrity;
the processor further configured to execute the decrypted instructions to generate data;
the first logic circuit and the hashing module further configured to encrypt the generated data; and
a second logic circuit configured to store the encrypted data in a second memory zone having a second level of access rights that is identical to the first level of access rights;
wherein the first memory zone forms part of a first memory comprising a first additional memory zone having a first additional level of access rights that is higher than the first level of access rights, the first additional memory zone configured to contain a first item of operating software for the processor;
wherein the first memory zone and the first additional memory zone form part of a secured domain of the first memory;
wherein the first memory further comprises an unsecured domain including a first unsecured memory zone that is configured to store at least one second software application and a second unsecured memory zone that is configured to store a second item of operating software for the processor, the second unsecured memory zone having a level of access rights that is higher than the level of access rights of the first unsecured memory zone; and
wherein the second memory zone forms part of a second memory comprising a partition of domains and of memory zones that is identical to that of the first memory with respective levels of access rights that are homologous to those of the first memory, the second logic circuit further configured such that the data generated by executing an item of software stored in one of the memory zones of the first memory are stored in a homologous memory zone of the second memory.

16. The integrated circuit according to claim 15, wherein the processor, the memory management module and the hashing module are further configured to verify a second integrity of the at least one second software application.

17. The integrated circuit according to claim 15, wherein the first logic circuit and the hashing module are further configured to decrypt the stored encrypted data, the processor is further configured to process decrypted data, the first logic circuit and the hashing module are further configured to encrypt new data generated by the processor, and the second logic circuit is further configured to store encrypted new data in the second memory zone.

18. The integrated circuit according to claim 15, wherein the processor, the memory management module and the hashing module are further configured to store a first footprint and a memory size of the at least one first software application, to calculate a second footprint of the at least one first software application by using the memory size and to compare the first and second footprints.

19. The integrated circuit according to claim 18, wherein the processor, the memory management module and the hashing module are further configured to calculate the second footprint by implementing a hash function having, as input parameter, the encrypted instructions and the memory size of the at least one first software application and delivering, as output, the second footprint.

20. The integrated circuit according to claim 15, wherein the first logic circuit is configured to implement a symmetric-key block cipher algorithm that includes no chaining between blocks and uses a secret key for encrypting and decrypting data.

21. The integrated circuit according to claim 15, wherein the processor comprises at least two processor cores, a first processor core configured to execute the at least one first software application, and a second processor core configured to execute the at least one second software application in parallel.

* * * * *